Dec. 9, 1969   J. N. GARDINER   3,482,869
FORK TRUCK OVERHEAD GUARD

Filed April 15, 1968   2 Sheets-Sheet 1

INVENTOR
JOE N. GARDINER

Dec. 9, 1969  J. N. GARDINER  3,482,869
FORK TRUCK OVERHEAD GUARD
Filed April 15, 1968  2 Sheets-Sheet 2

United States Patent Office 3,482,869
Patented Dec. 9, 1969

3,482,869
FORK TRUCK OVERHEAD GUARD
Joe N. Gardiner, 226 E. 21st St.,
Paterson, N.J. 07513
Continuation-in-part of application Ser. No. 589,392,
Oct. 25, 1966. This application Apr. 15, 1968, Ser.
No. 721,482
Int. Cl. B60r 21/02
U.S. Cl. 296—102                               9 Claims

ABSTRACT OF THE DISCLOSURE

This invention relates to overhead guards for forklift trucks, and more particularly to rotatable overhead guards.

This is a continuation-in-part of my copending application, Ser. No. 589,392, filed Oct. 25, 1966, now abandoned.

Overhead guards on forklift trucks are frequently required for protecting the operator from falling objects. Unfortunately, when a standard fork truck is fitted with a sufficiently heavy guard to give adequate protection, it is too tall to be driven into standard truck trailers as is desired for loading and unloading the trailers. Fork trucks have been made with overhead guards that are hydraulically movable from front to back, but these generally are expensive and difficult to incorporate into standard fork trucks.

Accordingly, it is an object of this invention to provide an inexpensive and easily installed overhead guard for forklift trucks which can be conveniently lowered to reduce the overhead clearance required for such trucks.

This and other objects of the invention are attained in an illustrative embodiment thereof comprising a rotatable overhead guard pivotally mounted between front and rear support members which in turn are mounted at opposite ends of a conventional forklift truck. The guard includes a flat top canopy portion and two generally V-shaped end portions which are mounted on the support members at their apexes. The two pivot points are located along a common horizontal axis so that the guard can be positioned in an upright position at which the top is horizontal, or can be pivoted sideways to a release position at which one side of the top rests against the fork truck.

A telescoping support member is included at the right front end of the fork truck for providing additional support of the rotatable guard. By the use of a key and lock arrangement, the support member is used to lock the guard in its upright position. As will be explained later, the components of the support member can be telescoped together to permit the guard to be rotated to its release position. A supplementary lock is also included to stabilize the guard in its upright position.

These and other objects, features and advantages of my invention will be better understood from a consideration of the following detailed description, taken in conjunction with the accompanying drawing in which.

Figure 1:
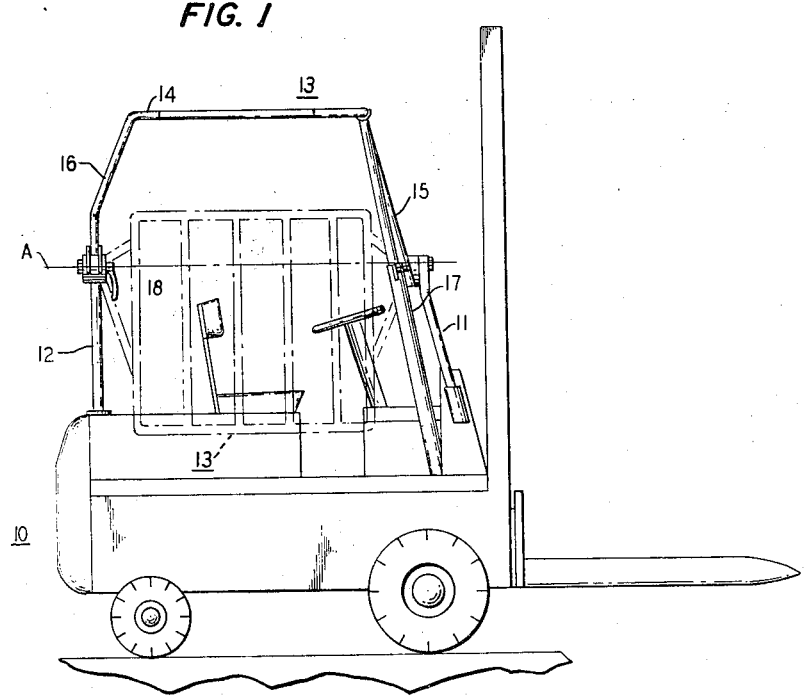
FIG. 1 is a side view of a fork truck including an overhead guard in accordance with the invention.

Referring now to the figures, FIG. 1 shows a conventional forklift truck 10 upon which has been mounted front and rear support members 11 and 12. An overhead canopy guard 13 is pivotally mounted to the support members so that it can be rotated from the overhead position shown to a release position 13' shown in phantom. The overhead guard comprises a flat top portion 14 and two generally V-shaped end portions 15 and 16, the apexes of which are mounted by pivots to the support members along a common axis A (FIG. 1) so that the guard can be freely rotated without any binding. The top portion includes a number of cross pieces as shown in phantom in FIG. 1. The telescoping support member 17 provides additional support to the guard and locks the guard when it is in the overhead position; the support member telescopes within itself to permit rotation to the release position.

Figure 4:
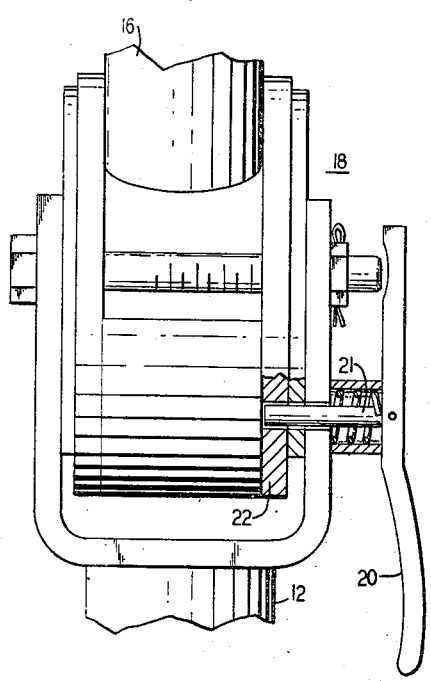
FIG. 4 is a sectional view of the supplementary lock mechanism of FIG. 1.

Located at the pivot mounting of end portion 16 on rear support member 12 is a supplementary lock mechanism 18, shown in detail in FIG. 4. The lock mechanism comprises a handle 20 to which is attached a spring-biased plunger 21. When the guard is located in the overhead position, the plunger 21 extends into an aperture in a plate 22 upon which the rear end portion 16 of the guard is mounted. The plunger 21 locks the plate 22 and therefore stabilizes the guard in its overhead position; further rotation is possible only by withdrawing the plunger 21 against the spring bias.

Figure 5:
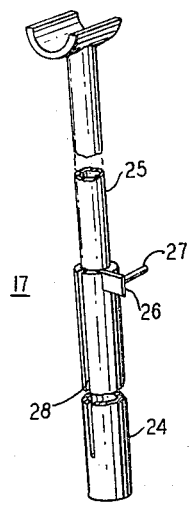
FIG. 5 is a view of the telescoping front support member of the overhead guard of FIG. 1.
Figure 2:
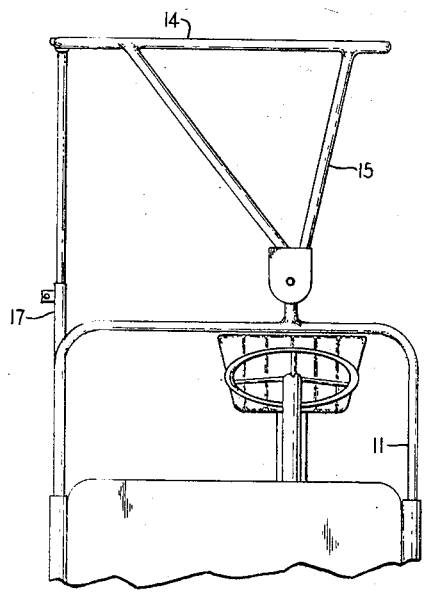
FIG. 2 is a front view of the overhead guard of FIG. 1.

The telescoping support member 17, shown in detail in FIG. 5, comprises a hollow cylindrical lower member 24 and an upper member 25 slideably mounted within the lower member. A key member 26 mounted on the upper member 25 is adapted to fit into a shallow slot of the lower member as shown to preclude spurious rotation of the upper member. When it extends upwardly, the upper member 25 fits snugly against the top flat portion of the guard 13 to give additional support against falling objects. When the guard is to be lowered, the key member is lifted from the shallow slot by grasping a handle 27 and is inserted into a longer slot 28, which permits the upper member 25 to telescope within the lower member 24. The lower member is mounted at an angle so that, as shown in FIG. 1, it does not interfere with rotation of the guard to its release position.

The purpose of the guard is to protect the operator from falling objects while he is stacking loads higher than his head; the two lock mechanisms maintain the guard in the overhead position during such operation. When the operator wishes to drive the fork truck through an opening with limited overhead clearance, such as into a trailer, under a mezzanine, etc., he pulls the handle 20 of FIG. 4 against the spring bias to release the lock and rotates the overhead guard 13 to the release position 13'. The rubber strip 23 may be bonded to the side of the guard top portion to cushion it as it rests against the fork truck in its release position.

Figure 3:
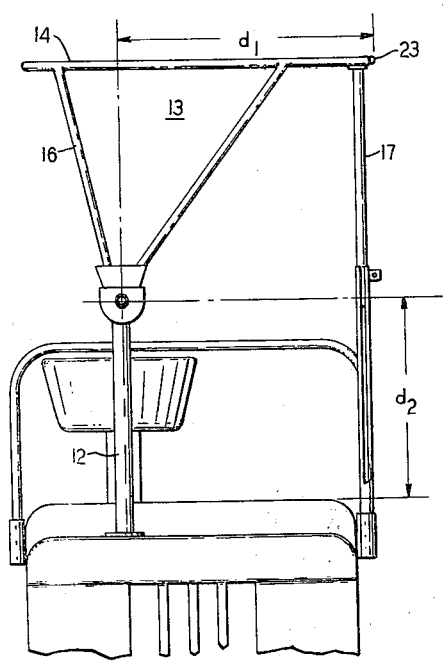
FIG. 3 is a rear view of the overhead guard of FIG. 1.

As shown in FIG. 3, the horizontal distance $d_1$ from the rubber strip to the pivot axis A when the guard is in the overhead position is preferably equal to the vertical distance $d_2$ from the rubber strip to the pivot axis when the guard is in its release position. With this provision, the guard rotates 90 degrees between the overhead and release positions and the flat top portion lies in a vertical plane when it is in the release position. This minimizes both the horizontal and vertical clearance requirements for the fork truck when the guard is in the release position.

The embodiment shown maximizes structural strength and safety as well as convenience of use. The end portions 11 and 12 are located in the same plane as the operator's seat and as such are usually displaced to the left of center of the truck as shown in FIG. 3. The telescoping support member 17, on the other hand, gives support primarily to the right of center to compensate for the non-symmetrical configuration of the guard. As shown in FIG. 1, front and rear end portions 15 and 16 slope toward each other to give an arch configuration that additionally increases structural strength.

The guard apparatus as shown has been built using 2.375 inch outside diameter, schedule 80 aluminum pipe for the components of the canopy guard 13, 2½ inch outer diameter, schedule 80 steel pipe for the rear support member 12, 1¾ inch outer diameter steel pipe for the front support member 11, 1¾ inch outer diameter steel pipe for the lower member 24, and 1¼ inch outer diameter steel pipe for the upper member 25. The overhead guard 13 supported a static load of 5,150 pounds without deflection and withstood the impact of a 100 pound cube dropped 10 times from a distance of five feet. As such, it was certified as meeting the American Standard Safety Code for Powered Industrial Trucks, ASA B56.1–1959.

As is implicit from the foregoing, my overhead guard is inexpensive, practical to install on conventional fork trucks, and easy to operate. These advantages derive chiefly from its simplicity of design; its essential characteristics are the flat top canopy portion, two V-shaped end portions that are pivotally connected at their apexes to the supports, and the telescoping support member. By using socket mounts or weldments and tubular pipe for the guard assembly as shown, fabrication is further facilitated. While a supplementary lock mechanism is preferred for stabilizing the guard in its upright position, numerous lock mechanisms other than that shown can be used. If so desired, the movable guard can be automatically operated by pivotally attaching the piston of a hydraulic cylinder to the guard so that the guard rotates in response to vertical movement of the piston. The telescoping support member 17 gives the entire structure a ruggedness and load-bearing capacity that compares with non-movable overhead guards and which complies with the ASA standards for such guards.

Figure 7:
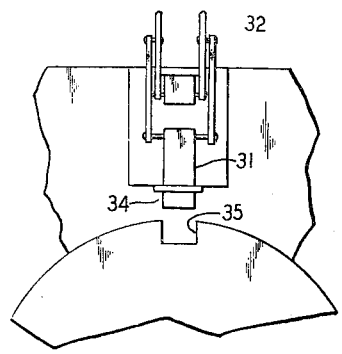
FIGS. 6 and 7 are side and front views of an alternative supplementary lock mechanism.
Figure 6:
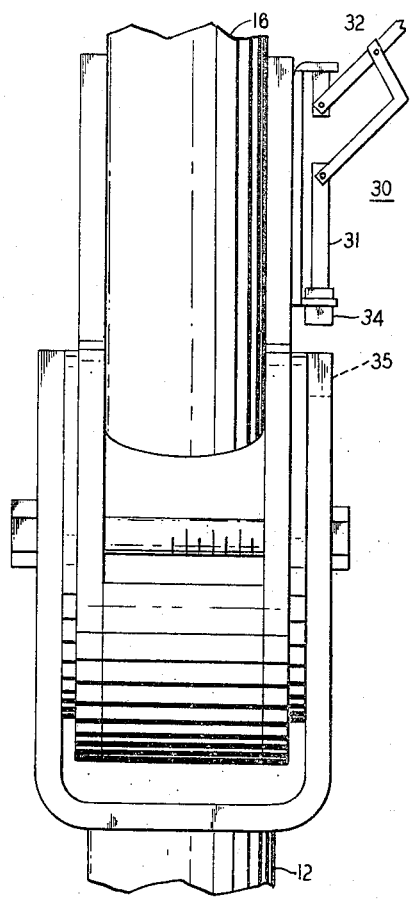

FIGS. 6 and 7 show an alternate supplementary lock 30 comprising a plunger 31 connected by a toggle linkage to a lever 32. When the lever 32 is pulled downwardly, the plunger 31 extends through an annular guide 34 into a slot 35 to lock the canopy guard securely in its upright position. The supplementary lock is of course released by pulling the lever 32 upwardly.

The embodiments shown are presented only for purposes of illustration. Various modifications thereof may be made by those skilled in the art without departing from the spirit and scope of the invention.

What is claimed is:

1. In a fork truck having a substantially horizontal body, a number of wheels, a steering wheel and a seat for an operator, the combination comprising:
   a front support member comprising a substantially U-shaped member extending between opposite sides of a front end of the fork truck;
   a rear support member;
   a movable overhead canopy guard comprising a substantially flat top portion and first and second end portions;
   the end portions each being substantially V-shaped with an apex;
   the apex of the first end portion being pivotally connected to the front support member, and the apex of the second end portion being pivotally connected to the rear support member;
   the two pivot connections lying along a common horizontal axis;
   and wherein the front support member and part of the second end portion slope toward each other substantially to form with the canopy an arch configuration.

2. The combination of claim 1 wherein:
   the front support member is attached to the front end of the body of the fork truck;
   the rear support member is attached to the rear end of the body of the fork truck;
   and the guard is rotatable between an overhead position at which the flat top portion is substantially horizontal and a release position at which the top portion is supported in a substantially vertical position.

3. The combination of claim 2 further comprising:
   means operable by the operator for locking the guard in its overhead position.

4. The combination of claim 3 wherein:
   the top portion rests against the fork truck body when the guard is in its release position;
   and further comprising a strip of resilient material along the side of the top portion that contacts the body;
   the vertical distance between the strip and the pivot axis when the guard is in its release position being substantially equal to the horizontal distance between the strip and the pivot axis when the guard is in its overhead position.

5. The combination of claim 3 wherein:
   the locking means comprises a plate having an aperture attached to one end portion of the guard;
   a plunger being axially spring biased in the direction of the aperture and being adapted to engage the aperture;
   and a lever for withdrawing the plunger from the aperture thereby to disengage the locking means.

6. The combination of claim 3 wherein:
   the locking means comprises a first plate having a first aperture and connected to the first end portion of the overhead guard and a second plate having a second aperture and connected to the rear support member;
   a plunger extending through the second aperture and being spring biased in the direction of the first aperture and adapted to engage the first aperture;
   and means comprising a lever for withdrawing the plunger from the first aperture, thereby to disengage the locking means.

7. The combination of claim 2 further comprising:
   a telescoping support member connected at one end to the truck near the front end thereof and adapted to extend toward and support the overhead guard in its upright position.

8. In a fork truck having a substantially horizontal body, a number of wheels, a steering wheel and a seat for an operator, the combination comprising:
   a front support member;
   a rear support member;
   a movable overhead canopy guard comprising a substantially flat top portion and first and second end portion;
   the end portions each being substantially V-shaped with an apex;
   the apex of the first end portion being pivotally connected to the front support member, and the apex of the second end portion being pivotally connected to the rear support member;
   the two pivot connections lying on the common horizontal axis;
   a telescoping support member connected at one end to the truck near the front end thereof and adapted to extend toward and support the overhead guard in its upright position;
   the telescoping support member comprising a hollow lower member and an upper member adapted either to fit within the lower member or extend therefrom to support the guard;
   the lower member being mounted on the truck at an angle and being so located as not to interfere with rotation of the guard.

9. The combination of claim 8 wherein:
   the lower member includes a first axial slot extending through one side thereof along a major portion of its length and a second axial slot located at its free end and extending for only a small distance;

and the upper member includes a key projection adapted to extend through either the first or second slots, whereby when the key projection extends through the first slot the upper member may be guided to move axially within the lower member and when the key projection extends through the second slot the upper member is locked in an upright position.

References Cited

UNITED STATES PATENTS

| | | | |
|---|---|---|---|
| 2,943,885 | 7/1960 | Fritzmeier | 296—102 |
| 3,188,111 | 6/1965 | Ells et al. | 296—102 |
| 3,205,003 | 9/1965 | Jensen | 296—102 |

BENJAMIN HERSH, Primary Examiner

JOEL E. SIEGEL, Assistant Examiner